United States Patent [19]

Nakayama

[11] Patent Number: 5,150,222
[45] Date of Patent: Sep. 22, 1992

[54] FACSIMILE APPARATUS WITH IMPROVED HANDLE CONFIGURATION

[75] Inventor: Norio Nakayama, Hyogo, Japan

[73] Assignee: Mitsubishi Denki Kabushiki Kaisha, Tokyo, Japan

[21] Appl. No.: 500,338

[22] Filed: Mar. 28, 1990

[30] Foreign Application Priority Data

Apr. 7, 1989 [JP] Japan .................. 1-40456[U]

[51] Int. Cl.$^5$ .................. H04N 1/00; A47B 95/02
[52] U.S. Cl. .................. 358/400; 312/244
[58] Field of Search .......... 358/400, 401; 312/244, 312/320; 364/708; D14/118

[56] References Cited

U.S. PATENT DOCUMENTS

D. 305,883  2/1990  Burton ................ D 14/106
4,951,241  9/1990  Hosoi et al. .............. 364/708

Primary Examiner—Edward L. Coles, Sr.
Assistant Examiner—Thomas D. Lee
Attorney, Agent, or Firm—Rothwell, Figg, Ernst & Kurz

[57] ABSTRACT

A facsimile apparatus provided with a handle which is pulled out of the facsimile body when the facsimile apparatus is carried. The handle is designed to be turned and set in an inclined positon relative to the facsimile body, thereby enabling the automatic and continuous feed of a plurality of original documents to be transmitted and accordingly dispensing with an original document tray.

2 Claims, 9 Drawing Sheets

FACSIMILE APPARATUS WITH IMPROVED HANDLE CONFIGURATION

BACKGROUND OF THE INVENTION

1. Field of the Invention

The present invention relates to a facsimile apparatus provided with a handle by which the apparatus can be carried about.

2. Description of the Prior Art

Figure 1:
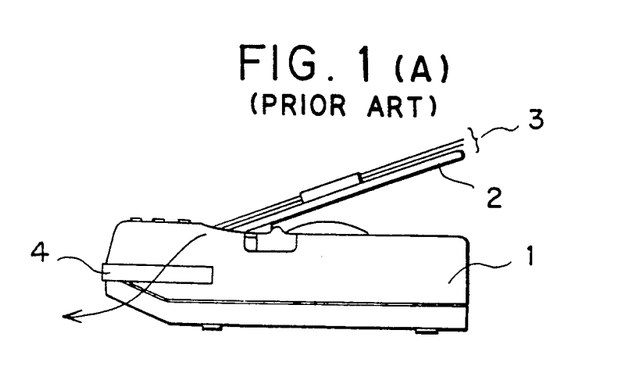
FIG. 1(A) is a side view of a conventional facsimile apparatus showing a plurality of original documents set ready for transmission.
FIG. 1(B) is a side view of a facsimile apparatus in FIG. 1(A) showing a handle in a pulled-out position.

FIG. 1 is a side view showing one example of a prior-art facsimile apparatus. In this drawing, numeral 1 is a facsimile body and numeral 2 denotes an original document tray capable of holding a plurality of original documents to be transmitted. This original document tray 2 is required to be long enough to hold the originals to be transmitted, for example about 250 mm to 300 mm long for the automatic feeding of A4 sheets. Numeral 4 indicates a handle which is usually in a stowage position and is pulled out when used to carry the apparatus.

Next, the function of the handle will be explained.

The original document tray 2 is mounted in an inclined position as shown in FIG. 1(A) in order to automatically and continuously feed a plurality of originals 3, and the plurality of originals 3 are set in this tray 2, from which the originals 3 are fed in one after another in the direction of the arrow shown in FIG. 1(A).

Figure 2:
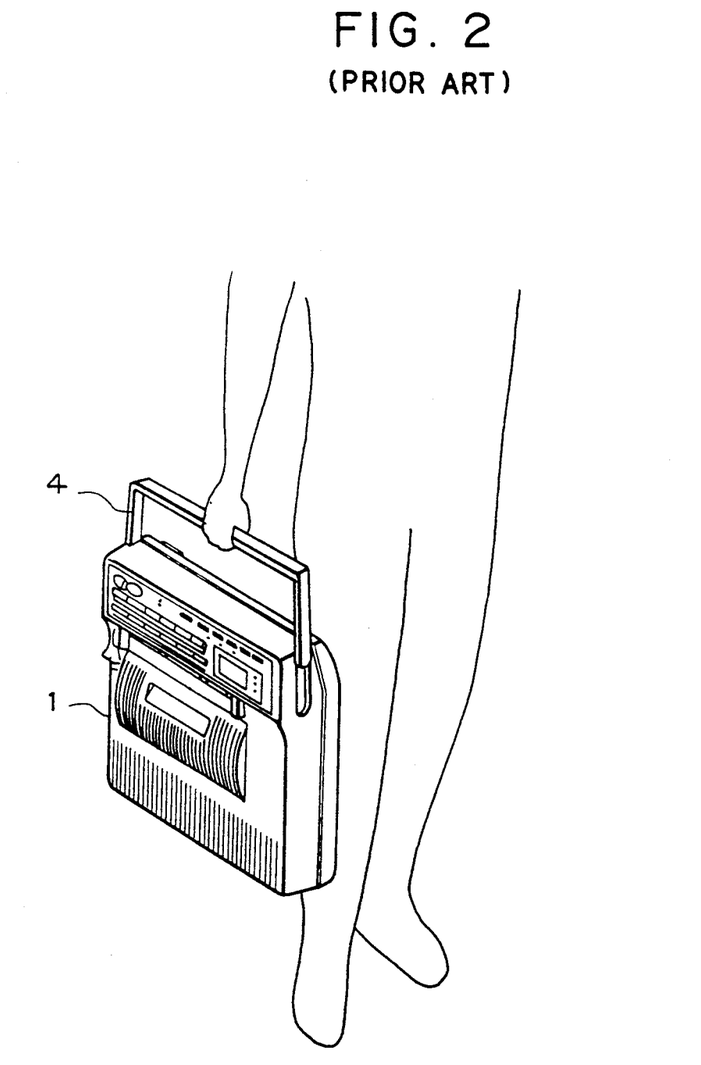
FIG. 2 is a perspective view showing the facsimile apparatus of FIG. 1(A) being carried.

When the facsimile apparatus is carried, the handle 4 that is in the stowed position in the facsimile body 1 is pulled out as shown in FIG. 1(B) and the original document tray 2 has to be detached. FIG. 2 shows the prior-art facsimile apparatus being carried.

Since the prior-art facsimile apparatus is of the above-mentioned constitution, it is necessary to detach the original document tray 2 and carry it separately when carrying the facsimile apparatus. Some facsimile apparatus, therefore, are provided with an automatic sheet feeder designed to set the original horizontally, not necessitating aslant mounting the tray 2. Facsimile apparatus having this type of automatic sheet feeding mechanism, however, has drawbacks such as complicated construction and high cost. Furthermore, some other apparatus have a folding original document tray, which, however, has the following problem that it becomes of complicated construction with a decrease in the size of the facsimile apparatus body. Further it will becomes difficult to build a thin facsimile apparatus.

SUMMARY OF THE INVENTION

The present invention is directed toward solving the aforementioned problems and has as its object the provision of a facsimile apparatus which requires no original document tray for automatic and continuous feeding of a plurality of original documents to be transmitted, thereby improving facsimile conveying efficiency.

In order to accomplish the aforementioned objects, the facsimile apparatus of this invention is provided with a handle designed to be pulled out of the facsimile body to enable the carrying of the facsimile body, and a handle fitting recess in which the handle fits without protruding at any portion out of the facsimile body. This handle fitting recess is formed on either side of the bottom of the facsimile body. When the handle is set back in this recess, the range of its rotation is restricted. In this handle fitting recess is formed a guide groove, in which a handle retaining disc is inserted to support the handle slidably and rotatably.

The foregoing objects and other objects, as well as new features of the present invention will become more apparent and understandable from the following detailed description thereof, when read in connection with the accompanying drawings.

DETAILED DESCRIPTION OF THE PREFERRED EMBODIMENTS

Hereinafter an exemplary embodiment of a facsimile apparatus according to the present invention will be described with reference to the accompanying drawings.

Figure 3A:
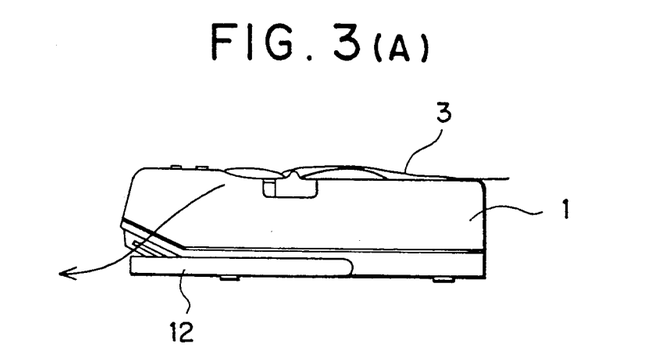
FIG. 3(A) is a side view of a facsimile apparatus according to one embodiment of the present invention showing the handle in a stowed position.
Figure 3B:
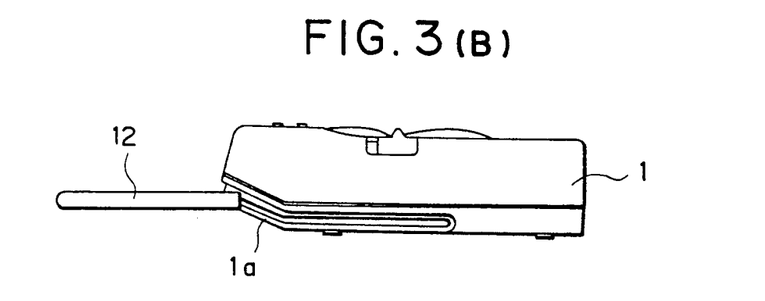
FIG. 3(B) is a side view of the facsimile apparatus in FIG. 3(A) showing the handle in a pulled-out position.
Figure 3C:
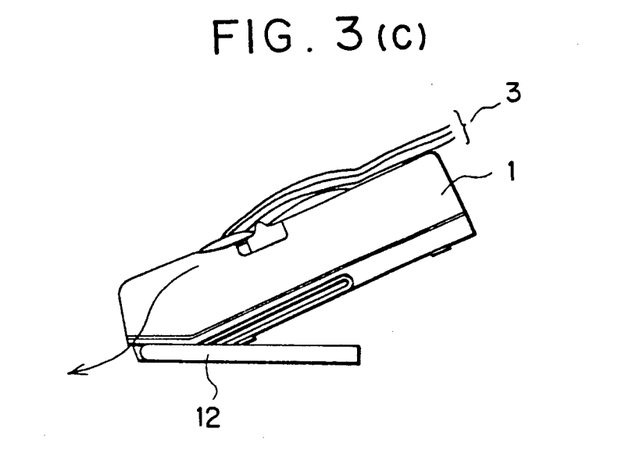
FIG. 3(C) is a side view of the facsimile apparatus in FIG. 3(A) showing the facsimile body set inclined on the handle used as a support base.
Figure 4:
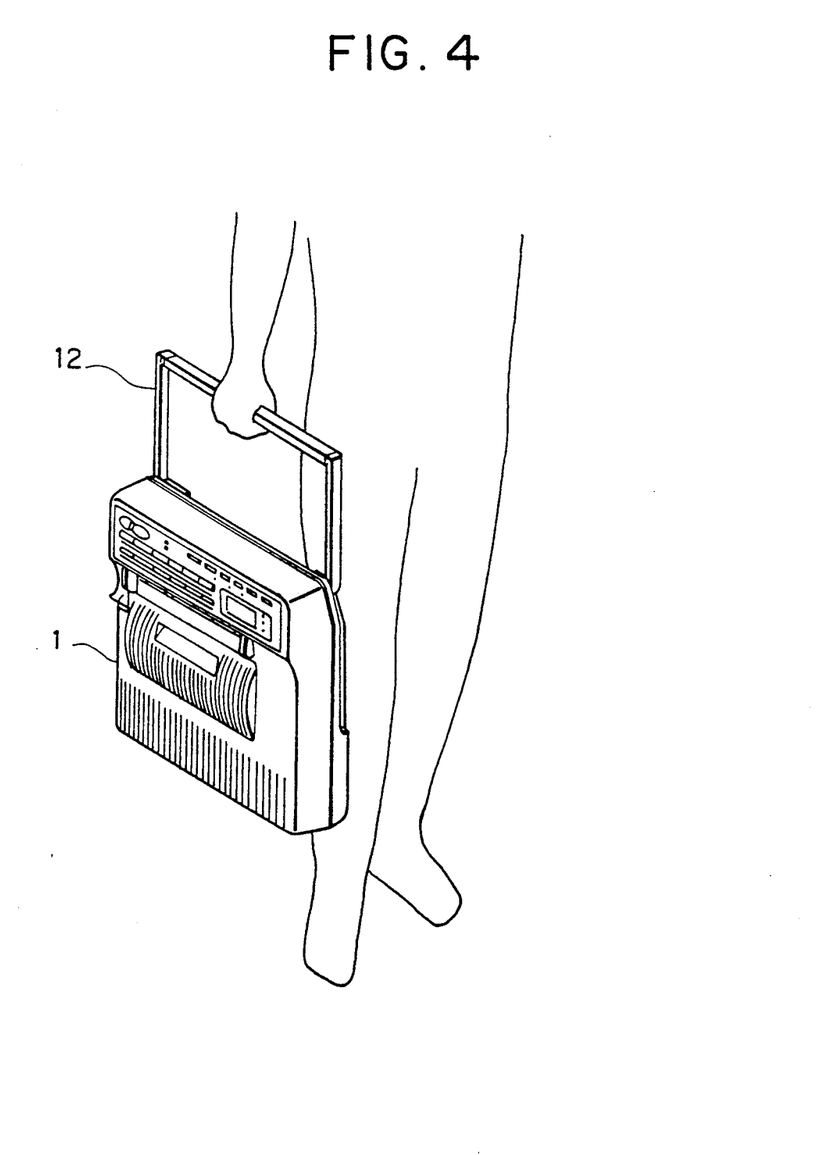
FIG. 4 is a perspective view showing the facsimile apparatus of FIG. 3(A) being carried.
Figure 5:
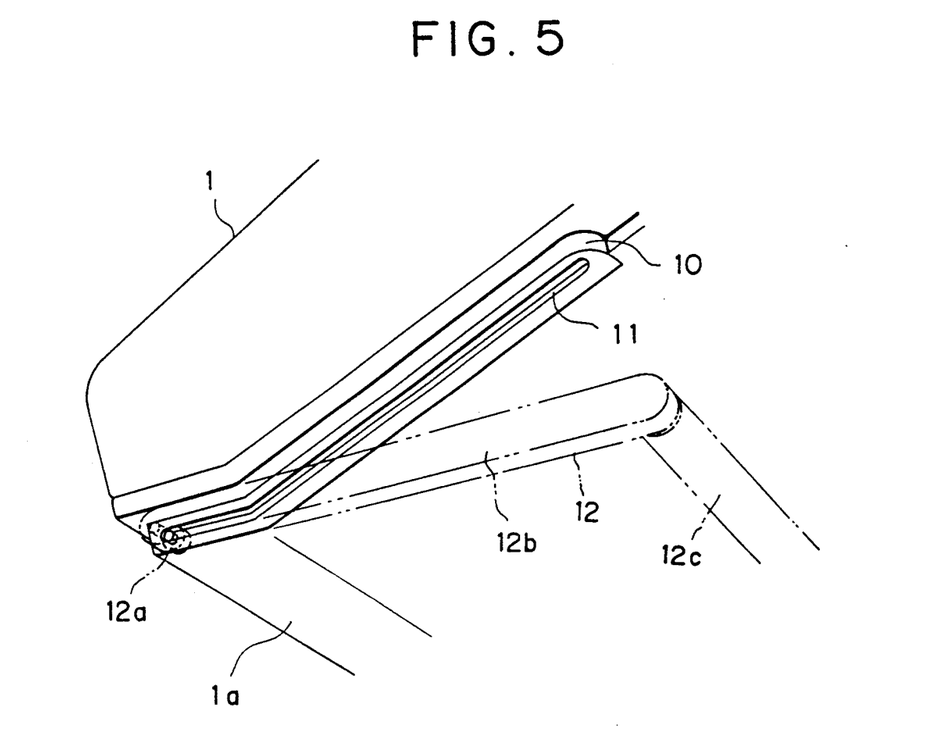
FIG. 5 an enlarged perspective view showing a major portion of the facsimile apparatus of FIG. 3(A)

FIGS. 3(A)—(C) is a side views showing one embodiment of the present invention; FIG. 4 is a perspective view showing a facsimile apparatus being carried; and FIG. 5 is an enlarged perspective view showing a major portion of the apparatus in FIGS. 3(A)-(C). In these drawings, a facsimile body 1 has an inclined bottom section 1a so formed that a discharge port (not illustrated) for discharging an original document to be transmitted will face downwardly. Numeral 10 is a handle fitting recess formed along the bottom surface in both sides of the bottom of the facsimile body 1. This handle fitting recess 10 has a guide groove 11 formed along a wall surface thereof. Numeral 12 is a handle slidably and rotatably pivoted in this guide groove 11. This handle 12 is pivotally supported with a shaft 12a having a handle retaining disc in the guide groove 11.

The arm section 12b of the handle 12 inserted in the handle fitting recess 10 of the facsimile body 1 is formed large enough to just fill the handle fitting recess 10 provided in either side of the facsimile body 1. The arm section 12b that can be fitted in the handle fitting recess 10 formed in both sides of the facsimile body 1 is provided with a grip 12c connecting the arm 12b. The arm 12b of the handle 12 inserted in the handle fitting recess 10 of the facsimile body 1 is formed large enough to just fill the handle fitting recess 10 provided in either side of the facsimile body 1. The arm section 12b that can be fitted in the handle fitting recess 10 in either side of the facsimile body 1 is provided with a grip 12c connecting the arm section 12b.

Next, the operation of the facsimile apparatus will be described.

When one original document 3 is transmitted, the original 3 inserted into an insertion port (not illustrated) of the facsimile body 1, will be automatically fed into the apparatus. In this case, the shaft 12a of the handle 12 is positioned at one end (rear end) of the guide groove 11, while the arm section 12b is fitted in the handle fitting recess 10. [See FIG. 3(A).]

When the facsimile body 1 is carried, the grip 12c is moved into contact with the other end (front end) of the guide groove 11 by sliding the handle shaft 12a along the guide groove 11. [See FIG. 3(B).] Then, the grip 12c is held to raise the facsimile apparatus as shown in FIG. 4, so that the apparatus becomes ready to carry.

Furthermore, to automatically and continuously feed a plurality of original documents 3 to be transmitted, the handle 12 is pulled out to the position shown in FIG. 3(B) and is turned around on the center axis of the other end of the guide groove 11 such that the arm 12b and the grip 12c will be positioned in the same plane as the inclined bottom section la of the facsimile body 1. The facsimile body 1 can be set inclined on a desk or a base as shown in FIG. 3(C). When the facsimile body 1 is set in the inclined position, the moment acting in the clockwise direction on the facsimile body 1 in FIG. 3(C) is supported by the shaft 12a pivotally supported in the guide groove 11 and by the arm 12b and the grip 12c held between the inclined bottom section lb of the facsimile body 1 and the base, and therefore the facsimile body 1 is held in the inclined position, enabling the automatic and continuous feed of a plurality of original documents 3 to be transmitted.

Figure 6A:
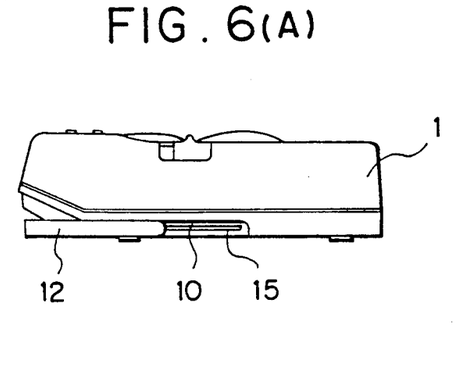
FIG. 6(A) is a side view embodiment showing the handle in the stowed position.
Figure 6B:
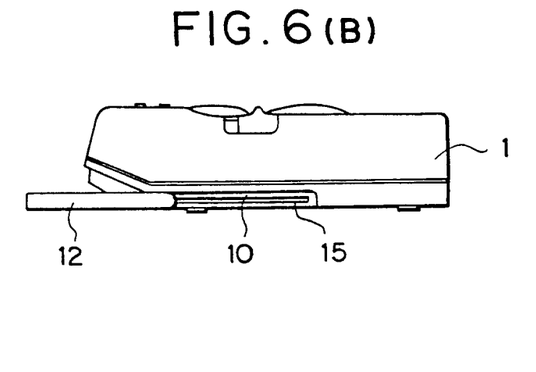
FIG. 6(B) is a side view of the embodiment in FIG. 6(A) showing the handle in the pulled-out position.
Figure 6C:
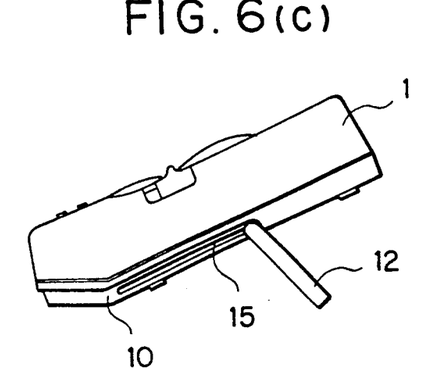
FIG. 6(C) is a side view of the embodiment in FIG. 6(A) showing the facsimile body set inclined on the handle used as a support base.
Figure 6D:
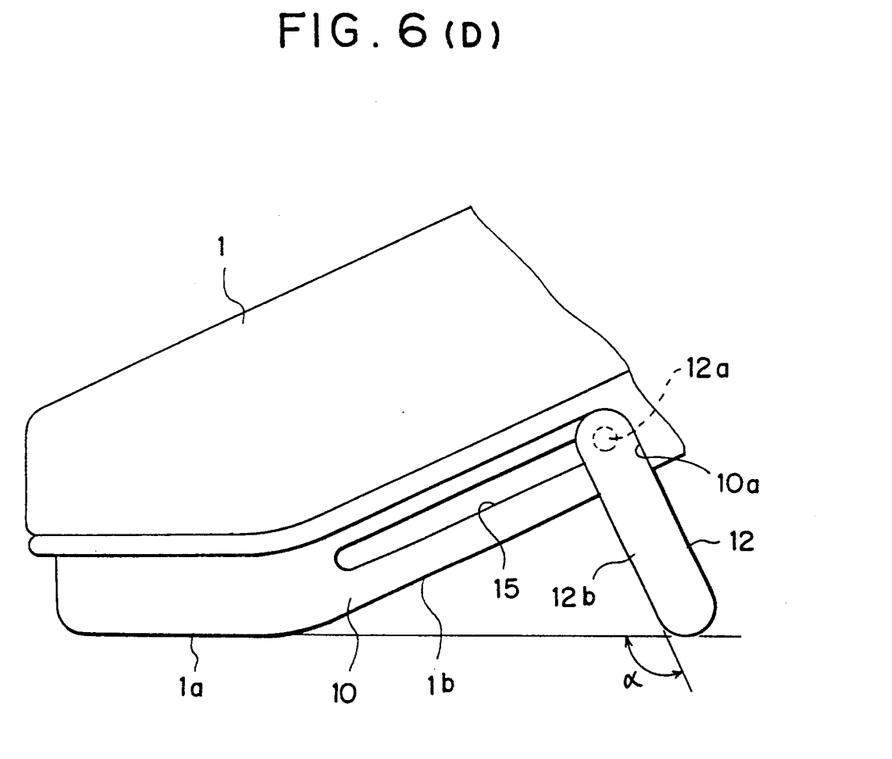
FIG. 6(D) is a partly enlarged side view of FIG. 6(C)
Figure 7A:
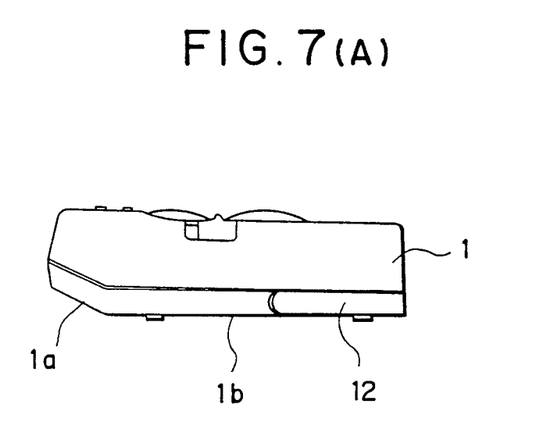
FIG. 7(A) a side view of another embodiment of the present invention showing the handle in the stowed position.
Figure 7B:
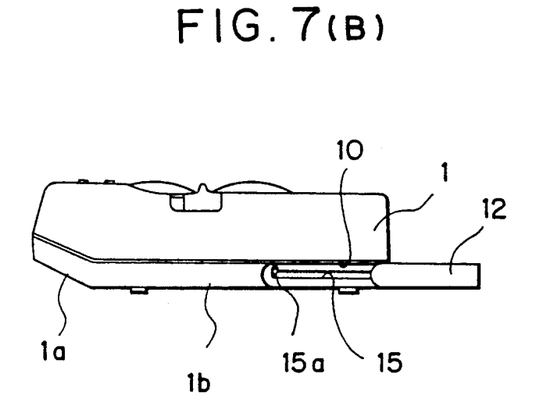
FIG. 7(B) is a side view of the embodiment in FIG. 7(A) showing the handle in the pulled-out position.
Figure 7C:
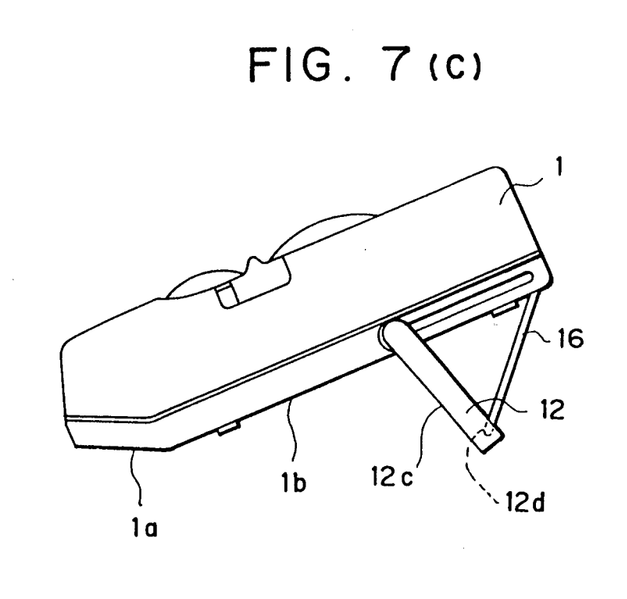
FIG. 7(C) a side view of the embodiment in FIG. 7(A) showing the facsimile body set inclined with the handle used as a support base.
Figure 7D:
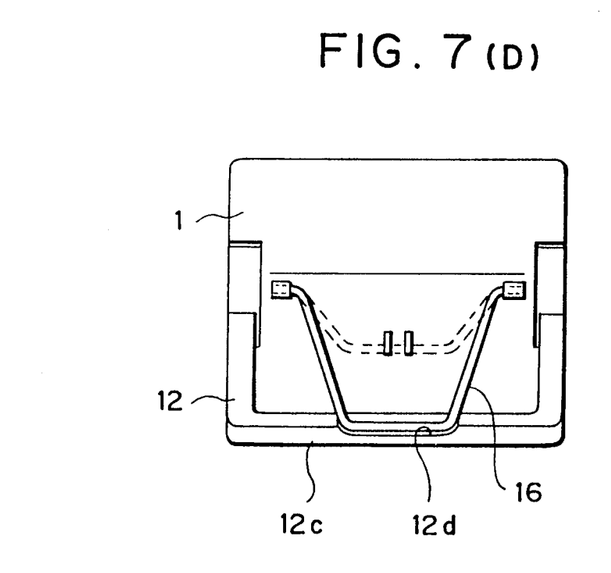
FIG. 7(D) an enlarged rear view of the embodiment in FIG. 7(A) of the facsimile body set in the inclined position.

In another embodiment shown in FIG. 6(A)-(D), a guide groove 15 is formed in the handle fitting recess 10 correspondingly to the flat bottom section 1b of the facsimile body 1; when the facsimile apparatus 1 is to be carried, the handle 12 is pulled out along the guide groove 15 [FIG. 6(B)], and when a plurality of original documents 3 are to be transmitted automatically and continuously, the handle 12 is turned into contact with one end section (rear end section) deep into the guide groove 15. Then, the handle 12 is turned over 90 degrees counterclockwise as shown in FIG. 6(C) to bring the arm 12b near the shaft 12a of the handle 12 into contact with the wall surface 10a of the handle fitting recess 10. When the arm 12b is in contact with the wall surface 10a of the handle fitting recess 10 as described above, the angle $\alpha$ between the arm 12b and the inclined bottom 1a of the facsimile body 1 increases to 90 degrees or more, thus locking the arm 12b on the wall surface of the handle fitting recess 10, and, accordingly, holding the facsimile body 1 in the inclined position.

FIG. 7(A)-(D) show another embodiment of the present invention, wherein the handle fitting recess 10 is formed in the rear-end flat bottom section 1b of the facsimile body 1. At the forward end of the guide groove 15 formed in this handle fitting recess 10 is provided a locking section 15a. Furthermore, at the rear-end flat bottom 1b of the facsimile body 1 is slidably and rotatably pivoted a support rod 16 which is engaged in a recess 12d formed in the grip 12c of the handle 12. To set aslant the facsimile body 1 to automatically and continuously feed a plurality of original documents 3 to be transmitted, the shaft 12a (not illustrated) of the handle 12 is set in the locking section 15a of the guide groove 15, and then the support rod 16 is engaged in the recess 12d formed in the grip 12c.

According to the present invention described above, the facsimile apparatus is so constructed as to hold the facsimile body in the inclined position with the handle, and therefore the original document tray, which was inconvenient when the apparatus was carried, can be disposed with, thereby enhancing a transport efficiency and enabling the provision of a small, simplified, low-cost apparatus.

What is claimed is:

1. A facsimile apparatus comprising:
   (a) a handle;
   (b) a handle fitting recess in which said handle is retractable into said facsimile body such that said handle will not protrude out of said facsimile body, said handle being slidable along said handle fitting recess away from said facsimile body;
   (c) said handle fitting recess formed in either side or both sides of a bottom of said facsimile body, said handle fitting recess having at least a first recess portion and a second recess portion wherein said first recess portion is at an angle with respect to said second recess portion;
   (d) a guide groove formed in said handle fitting recess and provided with a handle retaining disc for slidably and rotatably locking said handle to said facsimile body; and
   (e) means comprising at least said handle and said handle fitting recess for supporting said facsimile body in an inclined position.

2. The facsimile apparatus as set forth in claim 1 wherein said means for holding said facsimile body in an inclined position slidably and rotatably locks said handle such that said handle will be in the same plane as said first recess portion, thus forming an angle with said second recess portion.

* * * * *

UNITED STATES PATENT AND TRADEMARK OFFICE
CERTIFICATE OF CORRECTION

PATENT NO. : 5,150,222

DATED : September 22, 1992

INVENTOR(S) : N. Nakayama

It is certified that error appears in the above-identified patent and that said Letters Patent is hereby corrected as shown below:

On the cover, in the title "FACISIMILE" should be --FACSIMILE--.

Col. 1, line 1, "FACISIMILE" should be --FACSIMILE--.

Col. 1, line 42, "has" should be --have--.

Col. 1, line 45, delete "following".

Col. 1, line 47, delete "will".

Col. 2, line 11, "a" (second occurence) should be --the--.

Col. 2, line 27, after "view" insert --of another--; after "embodiment" insert --of the present invention--.

Col. 2, line 43, after "7(D)" insert --is--.

Col. 2, line 53, after "(C)" insert --are--., delete "is".

Col. 3, line 48, "FIG." should be --FIGS.--.

UNITED STATES PATENT AND TRADEMARK OFFICE
CERTIFICATE OF CORRECTION

PATENT NO. : 5,150,222

DATED : September 22, 1992

INVENTOR(S) : N. Nakayama

It is certified that error appears in the above-indentified patent and that said Letters Patent is hereby corrected as shown below:

Col. 4 line 9, "FIG." should be --FIGS.--

Signed and Sealed this

Twelfth Day of October, 1993

Attest:

BRUCE LEHMAN

*Attesting Officer*    *Commissioner of Patents and Trademarks*